3,799,882
PRODUCTION OF METAL OXIDES
Walter Philip Holland, Whitehaven, England, assignor to United Kingdom Atomic Energy Authority, London, England
No Drawing. Filed June 28, 1971, Ser. No. 157,740
Claims priority, application Great Britain, June 30, 1970, 31,777/70
Int. Cl. C01g 43/02
U.S. Cl. 252—301.1 R    6 Claims

ABSTRACT OF THE DISCLOSURE

A method of producing a metal oxide by thermal decomposition of its nitrate by dispersing an aqueous solution of the nitrate on a carbon matrix and heating to decompose the nitrate and, in the presence of oxygen to oxidize the carbon matrix. The method has particular advantage for the production of fissile oxides to be used as nuclear fuel.

BACKGROUND OF THE INVENTION

This invention relates to the production of metal oxides by thermal decomposition of their nitrates. The invention is considered to have particular application to the treatment of fissile material with which criticality problems can arise.

SUMMARY OF THE INVENTION

According to the present invention a method of producing a metal oxide from its nitrate by thermal decomposition comprises the steps of dispersing an aqueous solution of the nitrate on a carbon matrix and heating to decompose the nitrate and, in the presence of oxygen, to oxidize the carbon matrix.

The carbon matrix may be graphite in colloidal form or as powder, for example. Preferably, however the matrix is of carbon fibre felt. It has been found that the oxide product has a lower carbon content when carbon felt is used as the matrix. Carbon felt prepared by the carbonization of cotton wool or paper tissues has been found most satisfactory because of its low density and low impurity content.

In order to effectively disperse the nitrate solution on the carbon matrix a wetting agent may be required. With fissile nitrates and a carbon felt matrix acetic acid and butyric acid have been found satisfactory as wetting agents. Other organic acids may also be used. Only a few drops are generally required on the carbon felt surface prior to the addition of the aqueous nitrate solution.

The method is generally suitable for the treatment of metal nitrates which decompose to oxide on heating. It has particular advantages for the production of plutonium and uranium oxides and may conveniently be used for the production of mixed plutonium/uranium oxides which find use as nuclear fuel. Oxides produced by the method have a relatively high density.

The following are examples of ways of carrying the invention into effect.

Example 1

Carbon felt between 4 mm. and 10 mm. thick and of density between 0.1 and 0.2 g./cc. is disposed as a single layer in a tray or boat which may be of silica, platinum or alumina. The felt is wetted with acetic acid and aqueous plutonium nitrate solution of concentration 200 g./l. is added until the felt is covered. The tray is then placed in a furnace at 600° C. and the contents calcined first in a current of air and then in oxygen. With the oxygen current an exothermic reaction takes place and the temperature temporarily rises. The product is plutonium oxide $PuO_2$ containing less than 0.1% carbon.

Example 2

A carbon cottol wool 1½" thick and 8" square is placed in an Inconel boat and 1 litre of uranyl nitrate solution is added. The boat is heated in an Inconel furnace in air enriched with oxygen varying from 20% oxygen to 100% oxygen at 100° C. and 600° C. respectively. The product is a powder of $U_3O_8$.

Example 3

A colloidal graphite is placed in a 10 ml. silica boat and saturated with 8 ml. of cerous nitrate solution containing 100 g./l. of cerium. The silica boat is heated in a silica tube furnace in air from 100° C. to 600° C. and then 100% oxygen at 600° C. for 1 hr. The ceria powder product is extremely fine.

Example 4

A carbon felt is saturated with a zinc nitrate solution containing 300 g./l. of zinc. A silica boat containing 10 ml. of this felt is heated in an alumina furnace in air at 700° C. The product is zinc oxide in a powdery form.

Example 5

A saturated solution of cobaltous nitrate containing 300 g./l. of cobalt is absorbed into 20 ml. carbon felt in a silica boat. No additives were required. The felt was heated in an alumina furnace in air, the product was a brittle cake, resembling the carbon felt. When analyzed this cake contained 40 p.p.m. carbon and 73.8% cobalt.

I claim:

1. A method of producing metal oxide powder from a metal nitrate by thermal decomposition of the nitrate comprising the steps of dispersing an aqueous solution of the metal nitrate on a carbon felt matrix, and heating to decompose the nitrate and, in the presence of oxygen, to oxidize the carbon matrix.

2. A method according to claim 1 wherein the carbon fibre felt is the product of the carbonization of cotton wool.

3. The method according to claim 1 wherein the carbon fibre felt is the product of the carbonization of paper tissues.

4. A method according to claim 1 wherein the nitrate is a nitrate of a fissile metal.

5. A method according to claim 1 wherein dispersion of the nitrate on the carbon matrix is assisted by the addition of a wetting agent to the carbon matrix.

6. A method according to claim 5 wherein the wetting agent is either acetic acid or butyric acid.

References Cited

UNITED STATES PATENTS

| | | | |
|---|---|---|---|
| 3,385,915 | 5/1968 | Hamling | 264—0.5 |
| 3,406,228 | 10/1968 | Hardy et al. | 264—0.5 |
| 3,190,723 | 6/1965 | Jacobson | 264—29 X |
| 3,438,749 | 4/1969 | Lonadier et al. | 23—344 |
| 3,327,027 | 6/1967 | St. Pierre | 252—301.1 X |
| 3,297,405 | 1/1967 | Sperk et al. | 264—29 X |
| 3,556,712 | 1/1971 | Yoneshige et al. | 264—29 X |

CARL D. QUARFORTH, Primary Examiner
R. L. TATE, Assistant Examiner

U.S. Cl. X.R.

264—0.5 29; 423—251, 260, 592, 622